Figure 1:
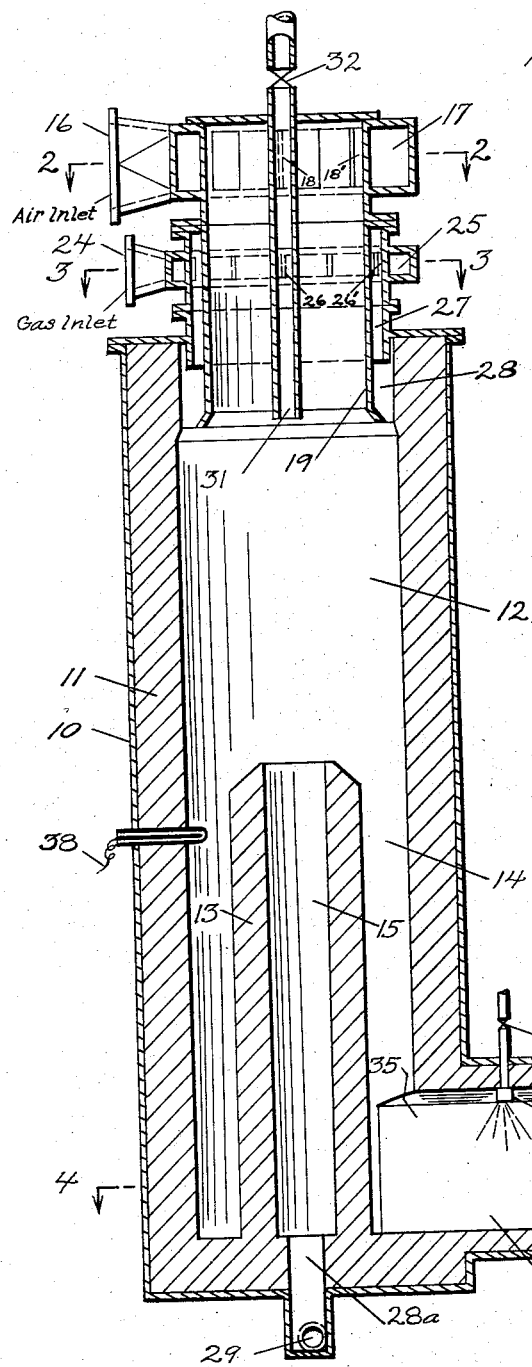

March 17, 1959 F. C. REED 2,878,104
PROCESS FOR PRODUCING CARBON BLACK
Filed March 4, 1952 5 Sheets-Sheet 1

Inventor
Forrest C. Reed
By Carl Hoffe

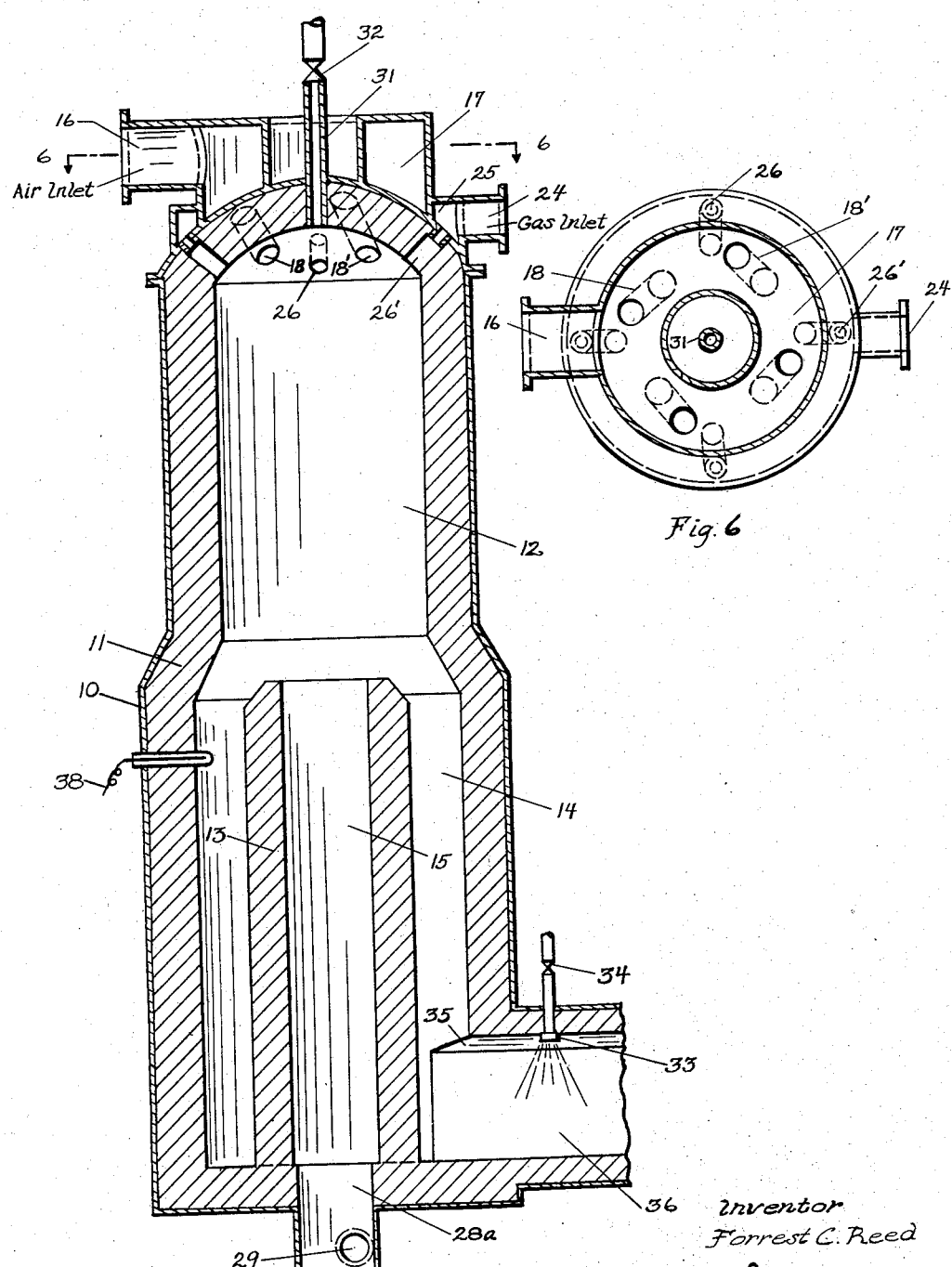

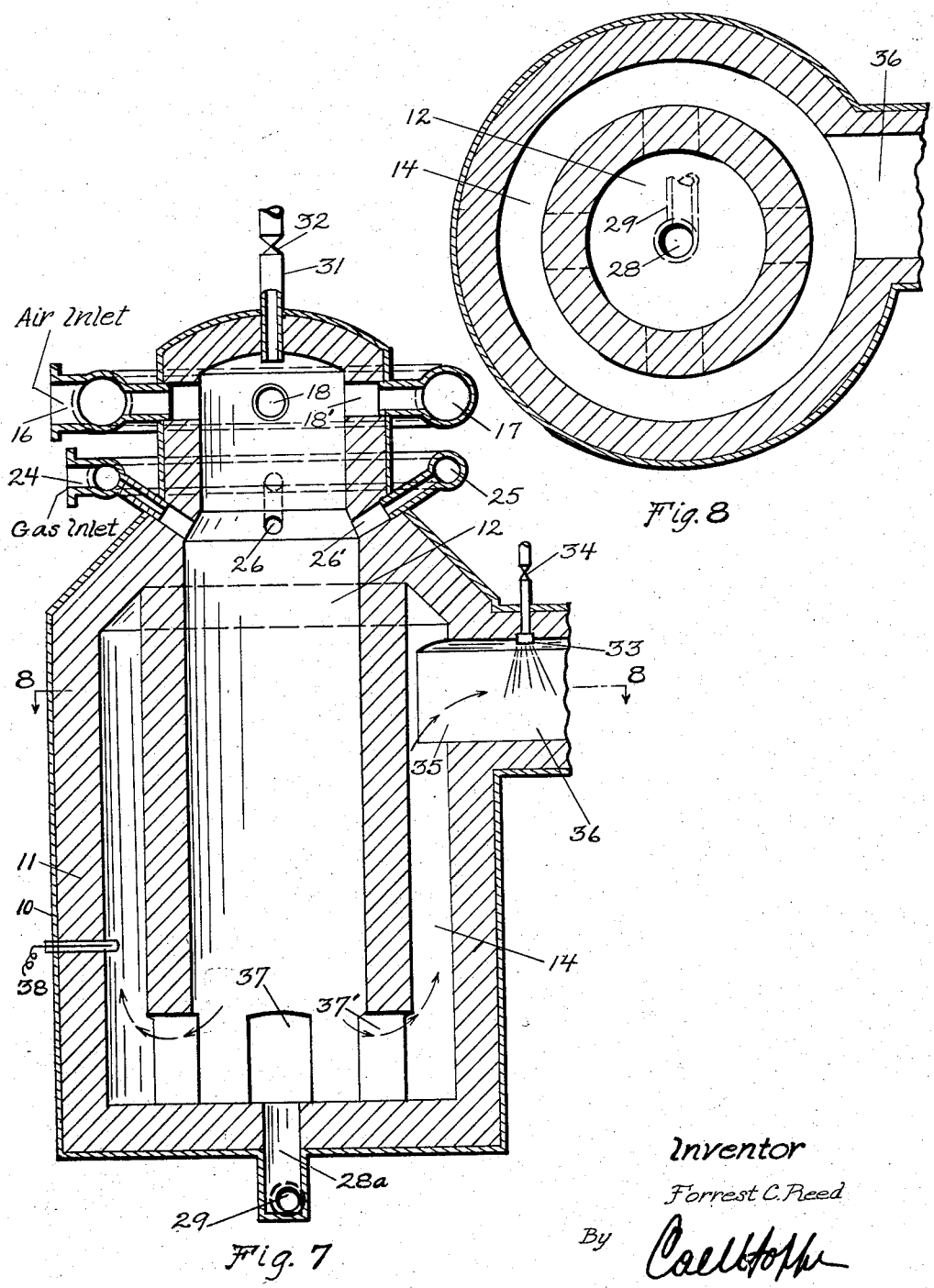

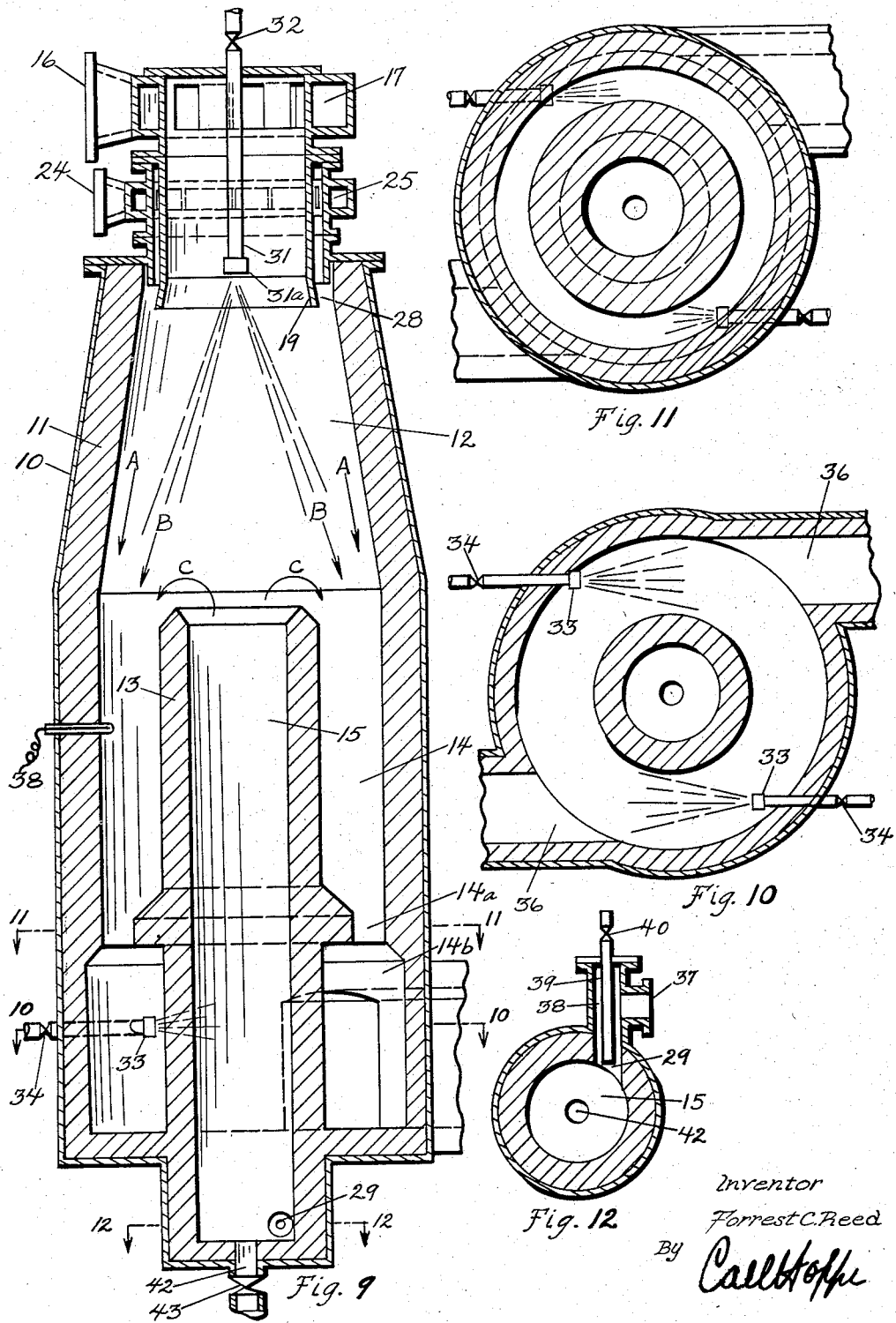

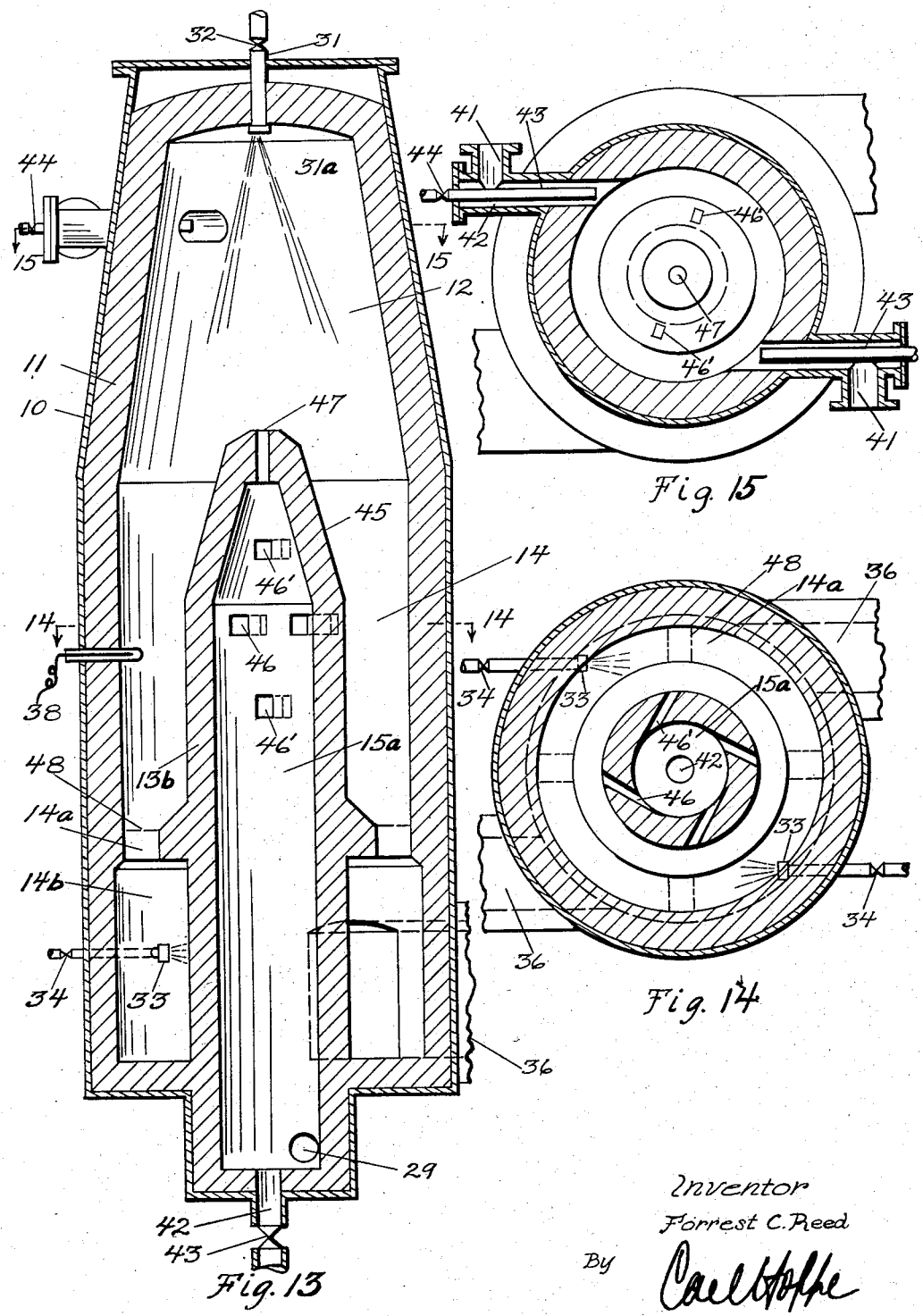

2,878,104
PROCESS FOR PRODUCING CARBON BLACK

Forrest C. Reed, San Francisco, Calif.

Application March 4, 1952, Serial No. 274,799

11 Claims. (Cl. 23—209.6)

This invention relates to a new and useful process for producing carbon black by the dissociation of a hydrocarbon by incomplete combustion and by contacting with hot gases and more particularly where the dissociation is expedited by the radiant heat from refractory surfaces. This application is a continuation-in-part of my copending application Serial No. 95,511, filed May 26, 1949, now abandoned. The primary object of the present invention is to provide a continuous method of producing carbon black of superior quality and to provide a method whereby high yields of commercially useful carbon black are obtained. A further object is to provide a method whereby carbon blacks of different characteristics can be produced in the same apparatus by controlling the operating conditions. A still further object is to provide a process which permits of larger capacities with any given size of apparatus thus being economical to operate.

Carbon blacks vary in particle size depending on the method of production and are in general classed as hard blacks and soft blacks according to the modulus at a given elongation (usually 400%) for natural rubber compounded therewith, the hard blacks having a modulus of about double that of soft blacks for a given time of cure. The finer particle size of hard black is made by the well known channel process while the larger particle size is made by the various furnace processes. Some soft blacks are made by the furnace processes. Other soft blacks are made by the so called thermal processes where alternate periods of heating and dissociation are carried out in closed retorts containing checkerwork. In some processes the particle size is reduced by the use of diluent gases in which case the tail gases from the process are usually recycled with the gas to be dissociated or with the air for partial combustion. Carbon blacks are therefore classed under various names as e. g., hard black, soft black, colloidal carbon, channel black, fine furnace black, high modulus black, conductivity black etc., all of which materials are included in the term "carbon black" as used in the specification and claims herein.

The terms "hydrocarbon" and "a potentially reactive hydrocarbon" as used in the specification and claims herewith include any hydrocarbon-containing gas, coke oven gas, atomized or vaporized oils, natural gas, a mixture of natural gas and vaporized or atomized oil or any other compound containing hydrocarbons such as unsaturated hydrocarbons contained in or produced by the partial cracking or reforming of oil or gas. The term "gaseous fuel" as used in the specification and claims herewith includes any hydrocarbon-containing gas, natural gas, vaporized or atomized oil, a mixture of any hydrocarbon-containing gas and vaporized or atomized oil. The term "air" includes any oxygen supplying gas.

In my U. S. Patent 2,163,630, June 27, 1939, I have disclosed a process for producing carbon black of high quality and with high yields and wherein the advantages of contacting surfaces under proper conditions are set forth. The conditions being that the hot dissociation zone should be relatively short and the time of contact of the hot gases with highly heated contacting surfaces should be limited to only a fraction of one second. The catalytic influence of refractory surfaces and method of moving the dissociation zone up or down in a retort was also disclosed. All carbon black patents, known to me prior to my above mentioned patent, disclosed the advantages of stream-line flow and non-turbulent flow as well as the disadvantages of contacting surfaces while I, in above patent, disclosed the advantages of turbulent flow and of contacting surfaces and a method of introducing a flow of air either axially or tangentially to a retort passage which provides a substantially enveloping space around the air flow and the simultaneous introduction of a hydrocarbon gas into said enveloping space. While the above named process is applicable to either a single-tube furnace or a multi-tube furnace, yet it is obvious that a much quicker mixing of gas and air is attained and a much greater area of contacting surface (about three times as much) is presented to the gases in a multi-tube furnace than in a single-tube furnace of substantially equal cross-sectional area but if the gases are introduced tangentially and made to flow spirally thru a single-tube furnace as disclosed in my above mentioned patent, they may contact the furnace wall several times in passing thru and this partly compensates for the lack of adequate highly heated contacting or heat radiating surfaces at the dissociation zone. The ordinary single-tube furnace of comparatively large capacity must, therefore, be of greater length to allow time for diffusion and mixing of air and gas and a longer time of exposure to higher temperature to complete dissociation which results in the production of a larger particle size of carbon black. These disadvantages are overcome by the process of the present invention in such a manner as to expedite dissociation in a shorter time and even permit operation at lower temperature as will be seen later.

I have now discovered that high yields of very fine hard carbon black having many of the characteristics of channel black can be produced by supplying air and a hydrocarbon gas separately and simultaneously and either axially or spirally to the unobstructed end of a retort passage where the gas mixes with and diffuses into the air and a partial combustion takes place thereby increasing the temperature of the partial combustion products toward the end of the unobstructed retort passage of limited contacting or heat radiating surface area, then at the end of the unobstructed passage a rapid dissociation of the hydrocarbon is effected by confining and completing dissociation in an uninterrupted solid ring-like stream within an annulus where dissociation is expedited to such an extent that the dissociation zone is shortened, the operating temperature lowered and the time of contact with any heat radiating surface at dissociating temperature is lessened preferably to only a small fraction of one second thereby preventing the deterioration of the quality of the carbon black and increasing the capacity of apparatus. When operating at normal capacity, the total time elapsing between the introduction of the hydrocarbon into the furnace and its exit therefrom in a dissociated form is in general considerably less than one second. A further discovery consists in controlling the dissociation by supplying additional gas or air or a hydrocarbon and air in combustible proportions or combustion gases to the products of the partial combustion at a point adjacent the entrance to said annular passage. Some preheating is accomplished by this method. From the foregoing and as will be seen later, it will be obvious that the hydrocarbon to be dissociated is subjected to a preliminary reaction and a final reaction.

Regardless of just what the precise influence of heated surfaces is on the dissociation of hydrocarbons, it is definitely known that prolonged subjection to, or too intimate contact with heated surfaces, such as with checkerwork, flues etc. which break the gas flow into small streams, is detrimental to the carbon black product. On the other hand, complete dissociation is difficult and slow with a loosely flowing gas stream, therefore the gas stream must somehow be confined within reasonable limits and without too much intimate contact with heated surfaces and this is accomplished by the process of the present invention by confining and completing dissociation within an annulus. The fact that gas flow must be closely confined is especially true when producing carbon black by the dissociation of oils, where with the ordinary processes, the furnace must be of small diameter and excessively long thereby subjecting the carbon product to longer deterioration from heat. Another detrimental aspect is the excessive loss of heat thru the wall of a small diameter furnace. The capacity of furnace will in general vary as the square of the diameter while the outer radiating surface varies only directly with the diameter, therefore if a process such as the present invention permits the doubling of the furnace diameter, the capacity is increased four times while the outer radiating surface is only doubled thereby greatly reducing the radiating losses and furthermore, since the refractory walls must be of a required thickness regardless of diameter, there is a very considerable saving in the cost of refractories and duplication of piping, valves etc. where the process permits of operation in the larger capacities such as with the process of the present invention.

Further objects and advantages of the process of the present invention will be seen in the following description and claims and in the light of the following drawings in which like numerals of reference indicate similar parts throughout:

Fig. 1 is a central sectional elevation showing one type of apparatus suitable for carrying out the process of the present invention.

Figure 2:
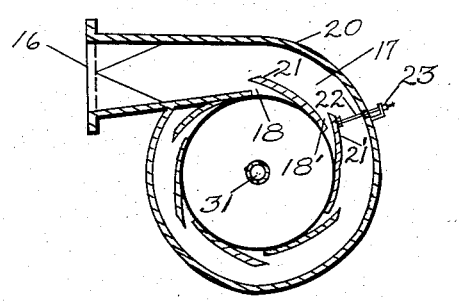
Figure 3:
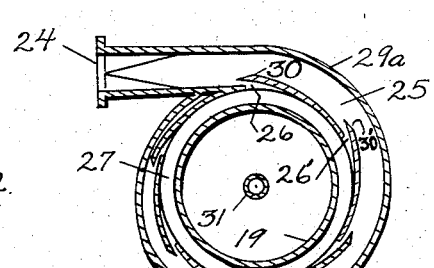
Figure 4:
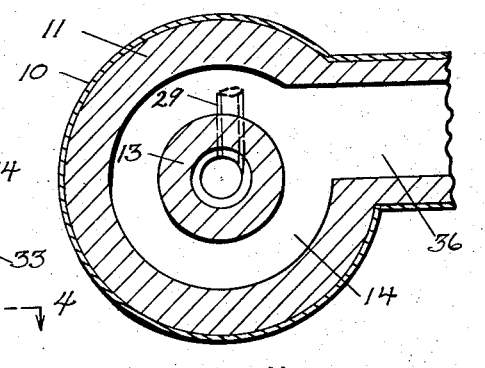

Fig. 2 is a horizontal section on line 2—2 of Fig. 1.
Fig. 3 is a horizontal section on line 3—3 of Fig. 1.
Fig. 4 is a horizontal section on line 4—4 of Fig. 1.
Fig. 5 is a central sectional elevation showing a modification of apparatus shown in Fig. 1.
Fig. 6 is a horizontal section on line 6—6 of Fig. 5.
Fig. 7 is a central sectional elevation of a still further modification of apparatus shown in Fig. 1.
Fig. 8 is a horizontal section on line 8—8 of Fig. 7.
Fig. 9 is a central sectional elevation showing a modification of apparatus shown in Figs. 1 and 5.
Fig. 10 is a horizontal section on line 10—10 of Fig. 9.
Fig. 11 is a horizontal section on line 11—11 of Fig. 9.
Fig. 12 is a horizontal section on line 12—12 of Fig. 9.
Fig. 13 is a central sectional elevation showing a modification of apparatus shown in Fig. 9.
Fig. 14 is a horizontal section on line 14—14 of Fig. 13.
Fig. 15 is a horizontal section on line 15—15 of Fig. 13.

Referring now to Fig. Nos. 1, 2, 3 and 4 of the drawings: In Fig. 1 showing one type of furnace suitable for carrying out the process of the present invention, 10 is an outer shell preferably of steel construction, 11 is the furnace lining of refractory material backed by suitable insulating material, 12 is an unobstructed cylindrical passage, 13 is a hollow cylindrical column of refractory material forming the outer annular passage 14 and the inner passage 15 communicating directly with the unobstructed passage 12 and with the outer flue 36 thru discharge passage 35. The pipe 29 is for supplying air or gas or a mixture of air and gas thru passages 28 and 15 to unobstructed passage 12. Fig. 2 is a section thru air chamber 17 formed by the preferably spiral shaped outer casing 20; 18, 18' etc. are nozzles formed by the vanes 21, 21' etc. These vanes can be fixed in position as at 21 or they may be adjustable as at 21' by means of the rod 22 and suitable adjusting nut 23, Fig. 3 is a section thru gas chamber 25 formed by the preferably spiral shaped outer casing 29a. The nozzles 26 and 26' etc. are formed by the vanes 30, 30' etc. which may be either fixed in position or adjustable as indicated in Fig. 2. The outer flue 36 is preferably substantially tangential to outer furnace wall as shown in Fig. Nos. 1 and 4 but could as well be located in any other suitable manner or there may be more than one flue as shown in Figs. 9 and 13. In Fig. 1, 19 is an air injecting tube preferably of heat resisting material and forming the outer annular enveloping spaces 27 and 28 communicating with air chamber 17 thru nozzles 18, 18' etc.; 31 is a pipe preferably of heat resisting material for supplying hydrocarbon gas to furnace centrally thru valve 32.

In order to readily identify passages 12 and 15 in specification and claims, the passage 12 will be referred to as a primary reaction passage and the passage 15 will be referred to as a secondary passage.

In one method of operation of the process of the present invention, air is supplied at 16 to air chamber 17 and thence thru nozzles 18, 18' etc. in a spiral manner and thru injection tube 19 to the unobstructed primary reaction passage 12 of furnace while a hydrocarbon gas is simultaneously supplied at 24 to gas chamber 25 and thence thru nozzles 26, 26' etc. and preferably in a spiral manner thru enveloping spaces 27 and 28 to primary reaction passage 12 of furnace where the hydrocarbon gas starts diffusing into the air flow and partial combustion is initiated in somewhat of a hollow turbulent flame as the hydrocarbon gas continues to diffuse inwardly from the outer flame surface and, in the preferred method of operation at normal capacity as will be explained later, the temperature of the partially burned mixture will increase as it travels toward the annular passage 14 where the partially burned mixture is subjected to radiant heat from the annular passage walls as the mixture passes therethru. The temperature of the gas mixture, now exposed to radiant heat on both the inner and the outer periphery of the annular gas flow, increases rapidly with a correspondingly rapid dissociation of the hydrocarbon and the liberation of carbon black therefrom. The products of dissociation are then discharged thru discharge passage 35 into flue 36 where they are preferably cooled by a water spray 33 controlled by valve 34 to a temperature preferably below 2000 degrees F. The hydrocarbon is therefore subjected to a preliminary reaction in the primary reaction passage 12 and to a subsequent and final reaction in the annulus 14. During the preliminary reaction, the temperature of the hydrocarbon is brought preferably up to or near the dissociation point then dissociation is completed in a final reaction within the annulus 14.

The gases leaving furnace flue 36 can be further cooled and the carbon black separated therefrom in any well known manner, as, e. g., the gases may be conducted to a cooling tower or stack where the temperature is further reduced to about 450 degrees F. which is necessary to prevent the condensation of the steam and other objectionable products such as naphthalene and their contamination of the carbon black product. From the cooling tower or stack the gases are preferably subjected to electrical precipitation by passing them thru a high voltage direct current ionizing field where the electrically charged carbon black particles agglomerate and a part will be removed in the precipitator hopper and then the remainder removed by settling vessels or cyclones or both following the precipitator. The cyclones may operate in parallel or in series or both. The carbon black may also be separated by the well known wash-box method where steam in addition to cooling water is used to expedite separation after which the carbon black is dried to volatilize and remove water and any other objectionable products from the carbon black. The carbon black may also be separated from the gases by means of bag filters or any other filtering means. I prefer to follow a high voltage ionizing section of an electrical precipitator with a settling chamber having a substantial cross-sectional area and wherein the gases leaving precipitator and entering settling chamber are directed downward at increased velocity so as to throw a large percentage of the agglomerated carbon black particles down into bottom hoppers after which the gases are directed upward at lowered velocity and into a plurality of comparatively small sized but efficient cyclones operating in parallel within the upper portion of settling chamber. The small cyclones then discharge into one or more large sized cyclones located outside of settling chamber and operating either in parallel or series or both. All of these methods are well known and are not shown on the drawings herewith.

Referring again to Fig. 1 of the drawings, it will be seen that the air is subjected to some preheating in passing thru injection tube 19 by the radiant heat from partial combustion and that the hydrocarbon gas is subjected to some preheating in passing thru annular space 28 by conduction from furnace wall and by radiation from the partial combustion. In operating the process of the present invention, additional hydrocarbon gas can be admitted to primary reaction passage 12 thru pipe 31 controlled by valve 32 or thru supply pipe 29 at bottom of furnace and passages 28 and secondary passage 15 which provides a method of controlling operation and temperatures. Or additional air may be admitted thru pipe 29 and passages 28 and 15 to control temperature and operation. The air or gas may be admitted tangentially to passage 28 as shown or axially. Obviously, a higher ratio of air to gas could be admitted at top of furnace so as to provide for the combustion of a greater portion of the hydrocarbon within the primary reaction passage 12 thereby producing a higher temperature therein while the hydrocarbon supplied at bottom of furnace thru secondary passage 15 becomes highly heated by the time it is mixed with the products of the incomplete combustion in annular passage 14 and consequently its dissociation is rapid and it is subjected to high temperature for a shorter time which results in the production of a very fine hard carbon black product. The overall temperature of the process can be regulated and controlled by regulating either the air flow or the hydrocarbon gas flow, the preferred method is to maintain a constant hydrocarbon gas flow and then regulate the air flow to control the temperature. This is usually accomplished automatically by means of a suitable thermocouple 38 controlling the air supply in any well known manner.

In connection with admitting a higher ratio of air to gas at top of furnace as previously mentioned, it should be noted that of the total percentage of the oxides of carbon in the tail gases, it is desirable to keep the percentage of carbon monoxide (CO) as low as possible because in accounting for the oxygen of the air burned with carbon, twice as much carbon is consumed with one volume of oxygen to produce less than one-third the amount of heat as compared to carbon burned to carbon dioxide ($CO_2$) and this represents a major loss in the efficiency of the process and the carbon black that might otherwise be recovered. In order to produce heat for dissociation, one ideal method is to first burn the carbon of a hydrocarbon to $CO_2$ as far as possible and to prevent as far as possible the later reaction $CO_2 + C = 2CO$ which not only absorbs heat but is wasteful of otherwise recoverable carbon black. It is further desirable to burn the hydrogen of a hydrocarbon to $H_2O$ and to prevent as far as possible the latter reaction $H_2O + C = CO$ which is likewise wasteful of carbon black.

Referring to Figs. 1, 5, 7 and 9 of the drawings, of the total quantity of a hydrocarbon required for the incomplete combustion of a given volume of air, only part need be introduced at 24 to primary reaction passage 12 of furnace thus producing combustion to mainly $CO_2$ in an outer ring near the wall of the primary reaction passage 12 thus producing more heat with the same amount of fuel. Simultaneously a quantity of any potentially reactive hydrocarbon can be introduced centrally thru pipe 31 at top of furnace to primary reaction passage 12 or thru secondary passage 15 at bottom of furnace or thru both top and bottom connections of furnace. The hydrocarbon introduced centrally at top of furnace will be subjected to the heat from the outer ring of combustion gases and any carbon liberated will have little opportunity before entering annulus 14 for the above mentioned objectionable reaction with the $CO_2$ of the outer ring of combustion gases. Any carbon liberated from the hydrocarbon introduced thru 15 at the lower end of furnace will have no opportunity at all to react with $CO_2$ until passing thru annulus 14 and here the dissociation is so rapid because of the heat radiating surfaces of the annulus walls and the time for reaction is so limited that both of the above mentioned objectionable reactions are held to a minimum and the yield of carbon black is increased accordingly and a high quality of carbon black is maintained.

Now instead of introducing a hydrocarbon thru secondary passage 15 at bottom of furnace as in the preceding example of operation, additional air can be supplied thru secondary passage 15 in which case the process is carried out by establishing either a spiral flow of partially combusted air and hydrocarbon or an outer spiral flow of substantially completely combusted gases and an inner axial flow of any potentially reactive hydrocarbon to the primary reaction passage 12 where, in a preliminary reaction, the hydrocarbon to be dissociated is heated to or near the dissociation point. Then a final reaction is brought about by inducing the gases from said primary reaction to flow into the annular passage 14 while simultaneously the additional air supplied thru secondary passage 15 is added to the inner side of the annular gas flow where further combustion takes place which, with the radiant heat from the annulus walls, provides a temperature effective for substantially completing the dissociation of unburned hydrocarbons and liberating carbon black therefrom. Obviously, the process could be carried out without introducing air or a hydrocarbon at bottom of furnace.

A still further method of operating the process is to provide combustion gases from an outside source for introducing thru secondary passage 15 or to provide a substantially combustible mixture thru secondary passage 15 and into the annular passage 14 with the effluent gases from the preliminary reaction. In either case when the outer spiral flow of combustion gases and a central flow of a potentially reactive hydrocarbon is established in the primary reaction passage 12, the potential reactive hydrocarbon enters the annulus 14 substantially between a layer of combustion gases on the outer side of annular gas flow and another layer of combustion gases on the inner side of annular gas flow and the dissociation is completed partly by contact with the hot combustion gases and partly by partial combustion and by radiant heat from the annular passage walls.

It is to be noted that due to the centrifugal force of the spiral gas flow thru annulus, the inner side of annular gas flow has little tendency to actually contact the refractory wall 13, therefore a substantial amount of heat radiating surface is provided without adding actual contact of the gases with refractory surface and in a most efficient manner.

The present invention is not limited to any particular number of injection nozzles as at 18, 18' etc. of Fig. 2 or 26, 26' etc. of Fig. 3 of the drawings. These nozzles provide one method of controlling the extent of the spiral movement of air and gas but it is possible and within the scope of this invention to omit nozzles entirely and provide a spiral movement by means of the spiral shaped casings 20 and 29 or by any other means. Since the volume of air is several times the volume of the hydrocarbon gas, the spiral injection of the hydrocarbon gas could be omitted and still the spiral rotation could be provided by the spiral injection of the air alone. In fact the process of the present invention is operable without the spiral injection of either gas or air and a fine grade of carbon can be produced but the capacity of apparatus would be somewhat reduced. It is also within the scope of the present invention to impregnate the refractory walls forming the annular passage 14 with any material which has an especial catalytic effect on the dissociation of hydrocarbons. I have found that hard burned incrusted carbon has a decided catalytic effect in this respect and therefore it would be possible to utilize hard graphite for this purpose.

It is to be understood that while the process of the present invention is not limited to any particular operating temperature, the temperature within the furnace may lie within the range from about 1600 degrees F. to about 2600 degrees F. or higher and will depend upon the capacity at which furnace is operated and the type of carbon black desired. It is obvious that when a furnace is operated at low capacity considerably less than normal capacity, the axial velocity of gases will be low and combustion will take place and the higher temperatures attained nearer the point of injection of the air and gas, the mixture is thereby subjected to high heat for a longer period of time which results in the production of a larger particle size and softer type of carbon black. On the other hand, when a furnace is operated at or above normal capacity according to the process of the present invention, the mixing of gas and air is slower and gradual thru primary reaction passage 12 and toward the annular passage 14 where, as previously explained, the temperature rise is rapid with a correspondingly rapid dissociation of the hydrocarbon and the separation of the carbon black therefrom. Since the volume of the gases increases with increased temperature, the axial velocity of travel is increased in annular passage 14 and can be further increased by decreasing the cross-sectional area of annulus 14 thereby reducing the time of exposure to high temperature in annulus. The maximum temperature may be reached soon after the gases enter annulus 14 after which the temperature may decrease somewhat because of the depletion of oxygen for combustion and the absorption of heat by dissociation while with still higher rates of operation the maximum temperature may exist at discharge passage 35. There is therefore a wide range of operation possible.

The temperature of operation does not entirely control the quality of the carbon black produced because the radiant heat from the annulus walls permits a generally lower temperature for dissociation and even at the higher temperatures the quality of the carbon black can be maintained because of the higher permissible gas velocity and the correspondingly shorter time of exposure to radiant heat from annulus walls.

It is to be understood that while the ratio of air to gas may vary from about 4 to 6 volumes of air to one volume of hydrocarbon gas, yet the present invention is not limited to any particular ratio. A gas rich in heavy hydrocarbons will require a higher ratio of air to gas than a lean gas and less air is required if either the air or hydrocarbon is preheated. This ratio also depends on the operating temperature maintained for, obviously, the sensible heat loss with the exit gases is higher at the higher operating temperatures and consequently more air is required to burn a greater portion of the hydrocarbons to replace this heat loss. The oxygen of the air used in the operation of a furnace producing carbon black should appear in the exit gases as free oxygen, as the oxygen in the oxides of carbon or as the oxygen in the water from the combustion of hydrogen but I have found from actual operation and the analysis of the exist gases that in some cases if all of the oxygen of the air actually used did appear in the above manner, there would be less carbon black recovered than was actually recovered. It therefore appears that some of the oxygen forms complex compounds with or on the surface of the carbon black particles and this may have some bearing on the high quality of the carbon black produced. These compounds may be in the form of $(C_2O_3)_n$ complex and $(CO)_m$ complex. In any event considerable oxygen from the air used goes along with the carbon black produced. It is clear from the foregoing that claims in a process of this nature cannot be predicated upon any particular ratio of air to gas.

In connection with the preheating of the air or hydrocarbon as mentioned in the preceding paragraph, it is obvious that with preheating, less combustion of fuel for heat is required within the furnace, the furnace could be smaller and operated at higher velocities for any given capacity and since the time of exposure to high temperature would be less, a somewhat finer particle size of carbon black would be produced. The preheating can be accomplished in any well known manner or by heat exchange with the exit gases. A finer particle size of carbon black can also be produced by the use of diluent gases in any well known manner such as by recycling the tail gases or hot combustion gases produced by the separate combustion of fuel can be used as a diluent. The use of diluent gases and external preheating are well known and applicable to the process of the present invention where, however, considerable preheating is provided for within the process and where the advantages of preheating are lessened because of the expedited dissociation thru annulus.

Referring now to the modifications of apparatus suitable for carrying out the process of the present invention and where like numerals of references indicate similar parts thruout all the drawings, the lower portion of the furnace shown in Fig. 1 could as well be altered to that shown in Fig. 5 where the outer wall forming annular passage 14 is of larger diameter than that of the primary reaction passage 12 thereby still further increasing the heat radiating surfaces of annular passage 14, or the air and gas supply of Fig. 1 could be admitted to furnace as indicated in the upper portion of Fig. 5 and in Fig. 6 where the air and gas are injected thru the refractory lining. The cross-sectional area of annular passage 14 of either Fig. 1 or Fig. 5 could as well be less than the cross-sectional area of the unobstructed primary reaction passage 12 so as to increase the velocity and decrease the time of contact of the gases with the heat radiating surfaces.

Another modification of apparatus suitable for carrying out the process of the present invention is shown in Fig. Nos. 7 and 8 of the drawings and where the annular passage 14 is constructed concentrically with and outside of the unobstructed passage 12 thereby shortening the overall length of furnace and reducing the heat loss thru outside wall. The air and gas could be admitted to furnace as in Fig. 1 or as shown at the upper portion of Fig. 7 where the air chamber 17 and gas chamber 25 are in the form of annular pipes, the air being injected to furnace thru nozzles 18, 18' etc. and the gas thru nozzles 26, 26' etc. The unobstructed passage 12 is communicatively connected with the annular passage 14 by a plurality of passages 37, 37' etc. which may discharge the gas mixture into annular passage 14 either somewhat tangentially or radially as shown. The operation of the process in the furnaces of Fig. Nos. 5 and 7 is the same as that described for the furnace of Fig. 1.

Referring to Fig. Nos. 9, 10, 11 and 12 of the drawings showing a further modification of Fig. Nos. 1 and 5 and suitable for carrying out the process of the present invention, the annulus 14 is preferably somewhat restricted at 14a and is extended to form the cooling passage 14b which communicates with one or more discharge flues 36. The cooling passage 14b is preferably maintained at a temperature below about 2000 degrees F. in order to prevent deterioration of the carbon black. The cooling may be accomplished with water sprays 33 controlled by valves 34 and so directed as to assist in maintaining the spiral flow of the gases. Air or a hydrocarbon can be admitted to secondary passage 15 either tangentially thru 29 or axially thru connection 42 controlled by valve 43. Fig. 12 shows a connection suitable for admitting either gas or air or a combustible mixture tangentially thru 29 to secondary passage 15. Air is admitted at pipe connection 37 and thru 38 and 29 to secondary passage 15 while fuel is admitted thru pipe 39 controlled by valve 40. The primary reaction passage 12 is preferably in the shape of a diverging cone. In starting operation a combustible mixture can be admitted to furnace at both top and bottom until the temperature of the apparatus is leveled off at the operating temperature.

With the apparatus of Fig. 9, the process can be carried out in a manner to suit the type of hydrocarbon to be dissociated. Air and a gaseous hydrocarbon can be admitted at top of furnace in proportions for incomplete combustion. A preliminary reaction takes place in the primary reaction passage 12 where the temperature of the hydrocarbon is increased to or near the dissociation point and a final reaction takes place within the annulus 14 either with or without the addition of air admitted thru secondary passage 15 but preferably with the addition of air thru secondary passage 15. When carbon black is to be produced from an atomized or vaporized oil or from a mixture of oil and a hydrocarbon gas, air and a gaseous fuel is admitted thru connections 16 and 24 in proportions suitable for the substantially complete combustion of the gaseous fuel so as to maintain an outer ring of hot combustion gases near the wall of the primary reaction passage 12 while the atomized or vaporized oil is introduced centrally thru pipe 31 and nozzle 31a and is subjected to a preliminary reaction from the heat of the outer ring of combustion gases and its temperature is thereby increased to or near the dissociation point then all of the gases are subjected to a final reaction within the annulus 14 either with or without the addition of air or combustion gases supplied thru secondary passage 15, but preferably with the addition of air. The dissociation is then completed within the annulus almost instantaneously and then the temperature is immediately reduced by the cooling sprays 33 in cooling chamber 14b. The gases are then discharged thru one or more flues 36 to further cooling and carbon black collecting apparatus as described for Fig. 1. From the foregoing it will be seen that when additional air is supplied at bottom of furnace thru secondary passage 15 which is one preferred method of operation, the flow of the hydrocarbon to be dissociated, indicated by the arrow B of Fig. 9, passes into the annulus 14 between the outer ring of combustion gases indicated by the arrow A and the inner ring of combusting gases indicated by the arrow C. Obviously a portion of the hydrocarbon for dissociation will be burned to produce heat but the remainder will be dissociated almost instantly from the heat of the surrounding gases and the radiant heat from the annulus walls.

Fig. Nos. 13, 14 and 15 show a modification of the apparatus of Fig. 9 and suitable for carrying out the process of the present invention. The operation of this furnace is substantially the same as for the furnace of Fig. 9. The main difference in construction is the burner shown in Fig. 15 and the secondary passage 15a which is closed in at 45 and the air is supplied to annulus thru passages 46, 46' and 47. Referring to Fig. 15, air is supplied thru one or more burner pipes 41 and 42 to primary reaction passage 12 while the hydrocarbon fuel is supplied thru the central burner pipe 43 controlled by valve 44. The inner wall 13b of annulus can be supported by outer wall 11 with suitable connections 48 and preferably shaped so as not to obstruct the spiral flow of gases thru annulus 14 and into cooling passage 14b. It should be noted that a downward flow of gases is preferable so as to give the reverse of a chimney draft. The back pressure thus produced serves to maintain a uniform distribution of gases.

It is obvious that in the normal operation of the process of the present invention, the furnace can be divided into the so called zones, as, e. g., a mixing and diffusion zone, a zone of progressive incomplete combustion, an active high temperature reaction zone where dissociation is rapid and a final zone of decreasing temperature. No claim is made to these so called predetermined zones since they are natural and inherent characteristics of a furnace process, as e. g., the location of dissociation zone can be changed at will as was disclosed above herewith and in my above mentioned Patent 2,163,630.

There are obviously still other modifications of the apparatus suitable for carrying out the process of the present invention, as, e. g., the unobstructed primary reaction passage 12 could be horizontal and at right angle to the annular passage 14, or parallel to annular passage 14 and communicatively joined by suitable flue connections, or the primary reaction passage 12 could be enlarged at lower end and the inner column 13 omitted and thereby still provide increased heat radiating surface. It is therefore to be understood that this invention is not limited to the details of construction shown in the drawings because it is capable of adaptation to other arrangements to provide suitable heat radiating surfaces for the purposes disclosed.

From the foregoing specification it will be obvious that I have provided a new and novel method for producing carbon black of fine hard quality, a method wherein provision is made for the diffusion and mixing of the air and a hydrocarbon gas, the gradual increase in temperature by a preliminary reaction in a primary reaction passage, then the rapid dissociation of the hydrocarbon at higher temperature and velocity and with a limited time of exposure to highly heated heat radiating surfaces and finally the quick reduction of temperature to a degree where the carbon black quality will not be deteriorated by heat. The process can be operated to produce a soft quality of carbon black as previously explained. Further provision is made to provide for the production of carbon black from atomized or vaporized oils or from a hydrocarbon gas and atomized or vaporized oils.

Obviously there are other ways of carrying out the process of the present invention without departing from the spirit and scope of the present invention, therefore I do not wish to be understood as limiting myself except by the following claims when construed in the light of the prior art.

I claim:

1. The continuous process of producing carbon black within a closed retort and from a hydrocarbon by a continuous reaction starting within an unobstructed primary passage of a generally circular cross-section and formed by one end of said retort, said reaction thereafter being confined and completed within a single uninterrupted annular passage at the opposite end of said retort and substantially concentric with and communicating with said primary passage, which comprises introducing an outer flow of air and a potentially reactive hydrocarbon at one end of and near the side wall of said primary passage the quantity of air being sufficient for the substantially complete combustion of said outer flow of a potentially reactive hydrocarbon, simultaneously introducing a separate and substantially central flow of a potentially reactive hydrocarbon to the same end of said primary passage and within said outer flow of air and hydrocarbon, initiating said continuous reaction by substantially completely combusting said outer flow of air and hydrocarbon and subjecting said central flow of a potentially reactive hydrocarbon to the heat of combustion of said outer flow to increase the temperature of said central flow, inducing all of the products of reaction to flow into said annular passage, simultaneously introducing a second flow of air at the opposite end of said retort thru the centrally positioned secondary passage formed by the inner wall of said annular passage and from thence into said annular passage and into contact with said effluent products of reaction, confining further reaction to an uninterrupted annular stream within said annular passage and completing said continuous reaction by combusting a further portion of the hydrocarbons and maintaining a temperature within said annular passage effective for expediting and substantially completing the dissociation of any unburned hydrocarbons and liberating carbon black therefrom, cooling the products of combustion and dissociation and thereafter separating the carbon black from the gases.

2. The process of claim 1 in which the outer flow of air and potentially reactive hydrocarbon is introduced to primary passage so as to provide an outer spiral flow and the central flow of a potentially reactive hydrocarbon is introduced axially.

3. The process of producing carbon black within a closed retort and from a hydrocarbon by a continuous reaction starting within an unobstructed primary passage of a generally circular cross-section formed at one end of said retort, said reaction thereafter being confined and completed within a single unobstructed annular passage at the opposite end of said retort, said annular passage being substantially concentric with and communicating with said primary passage, which comprises introducing a flow of air insufficient for complete combustion and a potentially reactive hydrocarbon at one end of said primary passage, initiating said reaction by combusting a portion of the hydrocarbon to provide increasing temperature of the gaseous mixture, then inducing the effluent gases to flow into said annular passage, simultaneously introducing a combustible mixture of air and gaseous fuel at the opposite end of said retort and thru the secondary passage formed by the inner wall of said annular passage, combusting said air and gaseous fuel and inducing the gases to flow into said annular passage and into contact with said effluent gases from said primary passage, confining said continuous reaction between all of the gases to an uninterrupted annular stream within said annulus and maintaining a temperature effective for completing the dissociation of unburned hydrocarbons and liberating carbon black therefrom, cooling the gases and thereafter separating the carbon black from the gases.

4. The process of claim 3 in which the air is introduced into said primary passage so as to provide a spiral flow of air and the potentially reactive hydrocarbon is introduced axially.

5. A continuous process for producing carbon black consisting in passing a stream of a hydrocarbon and a combustion sustaining gas in an advancing direction from an inlet point to a discharge point entirely disassociated from the inlet point, subjecting the stream during the first stage of its travel to a flame and to at least the disassociation temperature of the hydrocarbon and effecting only a partial dissociation of the hydrocarbon, passing the stream rapidly during a second stage of its travel and simultaneously forming it in the shape of a sleeve, subjecting the inner and outer surfaces of said sleeve formation to radiant heat surfaces and rapidly effecting a substantially complete dissociation of said hydrocarbon, and lowering the temperature of the stream below the temperature of dissociation of said hydrocarbon quickly during a third stage of its travel from said second stage to said discharge point.

6. A continuous process for producing carbon black consisting in passing a stream of a hydrocarbon and a combustion sustaining gas in an advancing direction from an inlet point to a discharge point entirely disassociated from the inlet point, subjecting the stream during the first stage of its travel to a flame and to at least the disassociation temperature of the hydrocarbon and effecting only a partial dissociation of the hydrocarbon, passing the stream rapidly during a second stage of its travel and simultaneously forming it in the shape of a sleeve, subjecting the inner and outer surfaces of said sleeve formation to radiant heat surfaces and rapidly effecting a substantially complete dissociation of said hydrocarbon, adding a gaseous substance to the stream after it passes from said first stage of its travel, and lowering the temperature of the stream below the temperature of dissociation of said hydrocarbon quickly during a third stage of its travel from said second stage to said discharge point.

7. A continuous process for producing carbon black consisting in passing a stream of a hydrocarbon and a combustion sustaining gas in an advancing direction from an inlet point to a discharge point entirely disassociated from the inlet point, subjecting the stream during the first stage of its travel to a flame and to at least the disassociation temperature of the hydrocarbon and effecting only a partial dissociation of the hydrocarbon, passing the stream rapidly during a second stage of its travel and simultaneously forming it in the shape of a sleeve, subjecting the inner and outer surfaces of said sleeve formation to radiant heat surfaces and rapidly effecting a substantially complete dissociation of said hydrocarbon, adding a gaseous substance to the stream as it passes from said first stage of its travel to said second stage of its travel, and lowering the temperature of the stream below the temperature of dissociation of said hydrocarbon quickly during a third stage of its travel from said second stage to said discharge point.

8. A continuous process for producing carbon black consisting in passing a stream of a hydrocarbon and a combustion sustaining gas in an advancing direction from an inlet point to a discharge point entirely disassociated from the inlet point, subjecting the stream during the first stage of its travel to a flame and to at least the disassociation temperature of the hydrocarbon and effecting only a partial dissociation of the hydrocarbon, passing the stream rapidly during a second stage of its travel and simultaneously forming it in the shape of a sleeve, subjecting the inner and outer surfaces of said sleeve formation to radiant heat surfaces and rapidly effecting a substantially complete dissociation of said hydrocarbon, adding a preheated gaseous substance to the stream as it passes from said first stage of its travel to said second stage of its travel, and lowering the temperature of the stream below the temperature of dissociation of said hydrocarbon quickly during a third stage of its travel from said second stage to said discharge point.

9. A continuous process for producing carbon black consisting in passing a stream of a hydrocarbon and a combustion sustaining gas in an advancing direction from an inlet point to a discharge point entirely disassociated from the inlet point, subjecting the stream during the first stage of its travel to a flame and to at least the disassociation temperature of the hydrocarbon and effecting only a partial dissociation of the hydrocarbon, passing the stream rapidly during a second stage of its travel and simultaneously forming it in the shape of a sleeve, subjecting the inner and outer surfaces of said sleeve formation to radiant heat surfaces and rapidly effecting a substantially complete dissociation of said hydrocarbon, adding a hydrocarbon to the stream as it passes from said first stage of its travel to said second stage of its travel, and lowering the temperature of the stream below the temperature of dissociation of said hydrocarbon quickly during a third stage of its travel from said second stage to said discharge point.

10. A continuous process for producing carbon black consisting in passing a stream of a hydrocarbon and a combustion sustaining gas in an advancing direction from an inlet point to a discharge point entirely disassociated from the inlet point, subjecting the stream during the first stage of its travel to a flame and to at least the disassociation temperature of the hydrocarbon and effecting only a partial dissociation of the hydrocarbon, passing the stream rapidly during a second stage of its travel and simultaneously forming it in the shape of a sleeve, subjecting the inner and outer surfaces of said sleeve formation to radiant heat surfaces and rapidly effecting a substantially complete dissociation of said hydrocarbon, constricting the thickness of said stream during a portion of the second stage of its travel; and lowering the temperature of the stream below the temperature of dissociation of said hydrocarbon quickly during a third stage of its travel from said second stage to said discharge point.

11. A continuous process for producing carbon black consisting in passing a stream of a hydrocarbon and a combustion sustaining gas in a spiral flow and in an advancing direction from an inlet point to a discharge point entirely disassociated from the inlet point, subjecting the stream during the first stage of its travel to a flame and to at least the disassociation temperature of the hydrocarbon and effecting only a partial dissociation of the hydrocarbon, passing the stream rapidly during a second stage of its travel and simultaneously forming it in the shape of a sleeve, subjecting the inner and outer surfaces of said sleeve formation to radiant heat surfaces and rapidly effecting a substantially complete dissociation of said hydrocarbon, and lowering the temperature of the stream below the temperature of dissociation of said hydrocarbon quickly during a third stage of its travel from said second stage to said discharge point.

References Cited in the file of this patent

UNITED STATES PATENTS

| | | |
|---|---|---|
| 1,723,418 | Hackford | Aug. 6, 1929 |
| 1,738,620 | Umpleby | Dec. 10, 1929 |
| 1,909,163 | Brownlee | May 16, 1933 |
| 2,163,630 | Reed | June 27, 1939 |
| 2,343,866 | Hincke | Mar. 14, 1944 |
| 2,375,795 | Krecji | May 15, 1945 |
| 2,375,797 | Krecji | May 15, 1945 |
| 2,391,067 | Mitchell | Dec. 18, 1945 |
| 2,413,586 | Skoog | Dec. 31, 1946 |
| 2,417,606 | Mitchell et al. | Mar. 18, 1947 |
| 2,420,999 | Ayers | May 27, 1947 |
| 2,519,696 | Orr | Aug. 22, 1950 |
| 2,656,254 | Heller | Oct. 20, 1953 |